US005978003A

United States Patent [19]
Brenner, Jr.

[11] Patent Number: 5,978,003
[45] Date of Patent: Nov. 2, 1999

[54] BELT POSITION DETECTION SYSTEM FOR BELT REGISTRATION IN AN ELECTROPHOTOGRAPHIC IMAGING SYSTEM

[75] Inventor: Robert E. Brenner, Jr., New Richmond, Wis.

[73] Assignee: Imation Corp., Oakdale, Minn.

[21] Appl. No.: 08/885,472

[22] Filed: Jun. 30, 1997

[51] Int. Cl.[6] .............................. G03G 15/01; H04N 1/04

[52] U.S. Cl. ........................... 347/116; 347/234; 399/165

[58] Field of Search ..................................... 399/165, 162, 399/54; 347/116, 118, 129, 234, 248; 250/231.1, 559.36, 559.37; 226/20

[56] References Cited

U.S. PATENT DOCUMENTS

| | | | |
|---|---|---|---|
| 4,740,081 | 4/1988 | Martens et al. | 250/231.1 X |
| 5,208,633 | 5/1993 | Genovese | 399/162 |
| 5,307,135 | 4/1994 | Amakawa et al. | 399/54 |
| 5,319,537 | 6/1994 | Powers et al. | 399/1 X |
| 5,365,074 | 11/1994 | Genovese | 250/559.29 |
| 5,442,388 | 8/1995 | Shieck | 347/116 |
| 5,519,230 | 5/1996 | Hubble, III et al. | 250/559.36 |
| 5,550,625 | 8/1996 | Takamatsu et al. | 347/116 X |
| 5,554,262 | 9/1996 | Turner | 226/20 X |
| 5,717,984 | 2/1998 | Wong | 399/165 |
| 5,737,003 | 4/1998 | Moe et al. | 347/116 |

FOREIGN PATENT DOCUMENTS

| | | |
|---|---|---|
| 0 494 105 | 8/1992 | European Pat. Off. . |
| 32 06 237 | 9/1983 | Germany . |
| 60-057040 | 4/1985 | Japan . |
| 60-178111 | 9/1985 | Japan . |
| 4-016979 | 1/1992 | Japan . |
| 5-165385 | 7/1993 | Japan . |
| WO 97/19388 | 5/1997 | WIPO . |

*Primary Examiner*—Susan S. Y. Lee
*Attorney, Agent, or Firm*—William D. Bauer

[57] ABSTRACT

A system for belt registration for use in an electrophotographic imaging system, which operates to detect a position of the photoconductor belt uses a pulsed light photodetection system disposed adjacent an edge of the photoconductor belt. The photodetection system may be synchronous or asynchronous. The registration system includes a belt steering system that steers the photoconductor belt based on the detected position to reduce deviation of the belt from a transport path. The registration system may also include a scan control system such that, based on the detected position, controls the modulation of laser beams scanned to form latent images on the photoconductor belt.

25 Claims, 11 Drawing Sheets

BELT POSITION DETECTION SYSTEM FOR BELT REGISTRATION IN AN ELECTROPHOTOGRAPHIC IMAGING SYSTEM

FIELD OF THE INVENTION

The present invention relates to multi-color imaging and, more particularly, to techniques for belt registration and for registering one or more color separation images on a photoconductor belt. The system includes a belt position detection system for detecting deviation of the photoconductor belt from a continuous transport path and a belt steering system that steers the photoconductor belt based on the detected position to reduce deviation of the photoconductor belt from the continuous transport path.

BACKGROUND OF THE INVENTION

In a multi-color electrophotographic imaging system, latent images are formed in an imaging region of a moving photoconductor. Each of the latent images is representative of one of a plurality of different color separation images. The color separation images together define an overall multi-color image. The color separation images may define, for example, yellow, magenta, cyan, and black components that, upon subtractive combination on output media, produce a visible representation of the multi-color image. Prior to an imaging cycle, a uniform charge is applied to the surface of the photoconductor. Each of the latent images is formed by scanning a modulated laser beam across the moving photoconductor to selectively discharge the photoconductor in an image-wise pattern. Appropriately colored developers are applied to the photoconductor after each latent image is formed to develop the latent images. The resulting color separation images ultimately are transferred to the output media to form the multi-color image.

In some electrophotographic imaging systems, the latent images are formed and developed on top of one another in a common imaging region of the photoconductor. The latent images can be formed and developed in multiple passes of the photoconductor around a continuous transport path. Alternatively, the latent images can be formed and developed in a single pass of the photoconductor around the continuous transport path. A single-pass system enables multi-color images to be assembled at extremely high speeds. An example of an electrophotographic imaging system configured to assemble a multi-color image in a single pass of a photoconductor is disclosed in co-pending U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM".

In an electrophotographic imaging system as described above, the latent images must be formed in precise registration with one another to produce a high quality image. In systems incorporating a photoconductor belt, precise registration can be difficult due to deviation of the belt from the transport path in a direction perpendicular to the transport path. Specifically, the photoconductor belt can undergo side-to-side movement during travel. The imaging region in which the latent images are formed is commonly fixed relative to the edge of the photoconductor belt. However, the scanning beam used to form each latent image in the imaging region is fixed relative to a start-of-scan coordinate. The side-to-side movement of the photoconductor belt, known as belt walking, can cause movement of the imaging region relative to the start-of-scan coordinate. As a result, misregistration can occur between different scan lines and between different latent images. This misregistration can significantly degrade image quality. In particular, the misregistration can produce visible artifacts in the final multi-color image upon transfer of the misregistered color separation images to the output media.

SUMMARY OF THE INVENTION

The present invention is directed to a belt registration system for use with an electrophotographic imaging system. The registration system utilizes a pulsed light detection system to detect a position of an edge of the photoconductor belt. In this manner, the registration system detects deviation of the photoconductor belt from the continuous transport path. The registration system includes a belt steering system that steers the photoconductor belt based on the detected belt edge position to reduce deviation of the belt from a continuous transport path. The registration system also may include a scan control system that, based on the detected position, controls the modulation of laser beams scanned to form latent images on the photoconductor belt. By controlling belt steering and laser beam scanning, the registration system maintains the image quality of a final multi-color image upon transfer of registered color separation images to an output substrate.

In one embodiment, the present invention includes a system for registration of a latent image relative to an edge of the photoconductor belt, wherein the photoconductor belt is ideally moving in a continuous transport path, and wherein the photoconductor belt tends to deviate from the continuous path in a direction substantially perpendicular to the continuous path. The system includes a pulsed light source located adjacent the edge of the photoconductor belt. A photodetection mechanism may be disposed to overlap the edge of the photoconductor belt, wherein the photodetection mechanism is responsive to the pulsed light source for providing a belt position signal representative of the position of the photoconductor belt relative to the continuous transport path. A belt steering mechanism is provided for moving the photoconductor belt in the direction substantially perpendicular to the continuous transport path. A belt steering controller is responsive to the belt position signal for controlling the belt steering mechanism based on the belt position signal to reduce deviation of the photoconductor belt from the continuous path.

The pulsed light source may be located on the side of the photoconductor belt opposite the photodetection mechanism, wherein the pulsed light source is in optical alignment with the photodetection mechanism. The pulsed light source may include a light emitting diode coupled to a pulse generator. In another embodiment, the pulsed light source is a pulsed laser scanner. The laser scanner is pulsed at a frequency greater than the scan frequency of the laser scanner.

The present invention may further include means for pulsing the pulsed light source. In one preferred embodiment, the pulsed light source is pulsed at a frequency different than 60 Hertz. In one embodiment, the pulsed light source is pulsed at a frequency greater than 100 Hertz.

The present invention may further include a scanner for scanning a laser beam across the photoconductor belt and a scan controller for modulating the laser beam based on image data to form the latent image on the photoconductor belt. The scanner is in optical alignment with the photodetection mechanism, and wherein the scanner scans a laser beam across the photoconductor belt and provides the pulsed light source for scanning the laser beam across the photodetector. The system may further include optical means, disposed between the scanner and the photodetector, for directing the laser beam to be incident on the photodetector at an angle substantially perpendicular to the photoconductor belt. The optical means may include a prism disposed between the scanner and the photoconductor belt, wherein the prism overlaps the photodetector and the edge of the photoconductor belt. The belt steering mechanism may include a roller adjustment mechanism for adjusting a position of one of the rollers, wherein the photoconductor belt tends to move in the direction substantially perpendicular to the continuous path in response to the adjustment of the portion of the respective roller.

In a second embodiment, the present invention includes a system for registration of a latent image on an endless photoconductor belt. The system includes a photoconductor belt mounted about a plurality of rollers. A drive mechanism is provided for driving the photoconductor belt to move about the rollers in a continuous path, wherein the photoconductor belt tends to deviate from the continuous path in a direction substantially perpendicular to the continuous path. A photodetector is disposed to overlap an edge of the photoconductor belt. A pulse generator is provided. A light source is coupled to the pulse generator, wherein the light source is positioned adjacent the photoconductor belt for providing a pulsed light beam incident on the photoconductor belt and incident on the photodetector, wherein the photodetector is responsive to the pulsed light beam for providing a belt position signal representative of the position of the photoconductor belt relative to the continuous path. A belt steering mechanism is provided for moving the photoconductor belt in the direction substantially perpendicular to the continuous path. A belt steering controller is provided for controlling the belt steering mechanism based on the belt edge detection signal to reduce deviation of the photoconductor belt from the continuous path.

The system may further include a scanner for scanning a laser beam across the photoconductor belt and a scan controller for modulating the laser beam based on data to form the latent image on the photoconductor belt. In one embodiment, the frequency of the pulse generator is different than the scan frequency of the laser scanner. In one particular embodiment, the frequency of the pulse generator is ten times greater than the scan frequency of the laser scanner. It is also recognized that the frequency of the pulse generator may be lower than the scan frequency of the laser scanner.

The belt steering mechanism may include a solenoid having an actuator coupled to a roller, wherein upon energization of the solenoid, the roller is adjusted resulting in movement of the photoconductor belt in a direction substantially perpendicular to the continuous path and in a direction which reduces deviation of the photoconductor belt from the continuous path. The belt steering controller may include an asychronous detection system responsive to the belt position detection signal for providing a direct current signal to the belt steering mechanism, wherein the direct current signal is proportional to belt position. The asynchronous detection system may include a band pass filter electrically coupled to a rectifier.

Alternatively, the belt steering controller may include a synchronous detection system responsive to the belt position detection signal for providing a direct current signal to the belt steering mechanism, wherein the direct current signal is proportional to belt position. The synchronous detection system may be coupled to the frequency generator. The synchronous detection may include a band pass filter coupled to a sample and hold circuit. In one embodiment, the sample and hold circuit is responsive to the frequency generator. Further, a group delay circuit may be coupled between the frequency generator and the sample and hold circuit to adjust for time delays.

The advantages of the present invention will be set forth in part in the description that follows, and in part will be apparent from the description, or may be learned by practice of the present invention. The advantages of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

The present invention provides a belt position detection system for belt registration and registration of color separation images on a photoconductor belt. The system includes a belt edge position detection system utilizing a pulsed light source to detect deviation of the moving photoconductor belt from a continuous transport path, and a belt steering control system for steering the photoconductor belt based on the detected position to reduce deviation of the photoconductor belt from the continuous transport path. The registration system may further incorporate a scan control system for controlling the laser beams scanned by image scanners based on the detected position. The pulsed light belt position detection system can be used in a wide range of light conditions, ranging from bright ambient light to total darkness. Further, the pulsed light position detection system in accordance with the present invention is less susceptible to external noise sources.

Figure 1:
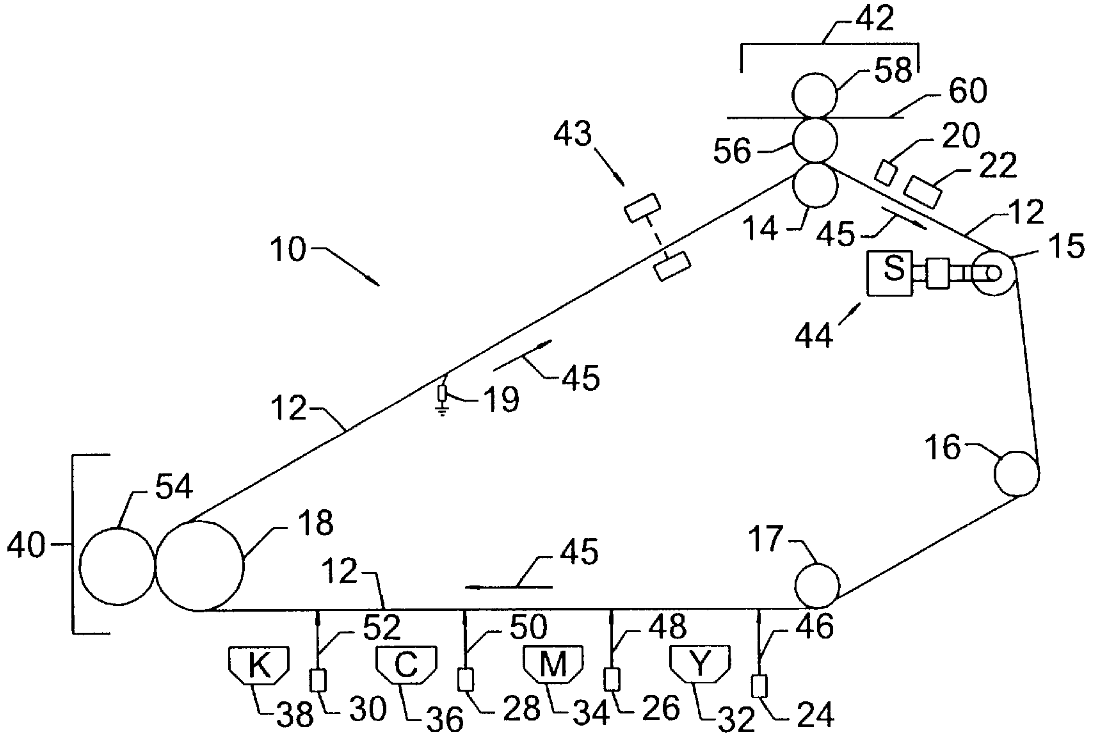
FIG. 1 is a schematic diagram conceptually illustrating an exemplary electrophotographic imaging system, including a belt registration system, in accordance with the present invention.

FIG. 1 is a schematic diagram conceptually illustrating an exemplary electrophotographic imaging system 10 including the pulsed light belt position detection system and belt steering system in accordance with the present invention. In the example of FIG. 1, imaging system 10 includes a photoconductor belt 12 mounted about a plurality of rollers 14, 15, 16, 17, 18, a grounding brush 19, an erasure station 20, a charging station 22, a plurality of scanners 24, 26, 28, 30, a plurality of development stations 32, 34, 36, 38, a drying station 40, a transfer station 42, a pulsed light belt position detection system 43 and a belt steering system 44. The imaging system 10 forms a multi-color image in a single pass of photoconductor belt 12 around a continuous transport path. An imaging system capable of assembling a multi-color image in a single pass of a photoconductor is disclosed, for example, in co-pending U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM". The entire content of the above-referenced patent application is incorporated herein by reference.

In operation of system 10, photoconductor belt 12 is driven to travel in a first direction indicated by arrows 45 along the continuous transport path. As photoconductor belt 12 moves along the transport path, erasure station 20 uniformly discharges any charge remaining on the belt from a previous imaging operation. Additionally, grounding brush 19 mechanically couples the photoconductor belt 12 to ground potential. The photoconductor belt 12 then encounters charging station 22, which uniformly charges the belt to a predetermined level. The scanners 24, 26, 28, 30 selectively discharge an imaging region of photoconductor belt 12 with laser beams 46, 48, 50, 52, respectively, to form latent electrostatic images. Each latent image is representative of one of a plurality of color separation images.

As shown in FIG. 1, each development station 32, 34, 36, 38 is disposed after one of scanners 24, 26, 28, 30, relative to the direction 45 of movement of photoconductor belt 12. Each of development stations 32, 34, 36, 38 applies a developer having a color appropriate for the color separation image represented by the particular latent image formed by the preceding scanner 24, 26, 28, 30. In the example of FIG. 1, development stations 32, 34, 36, 38 apply yellow (Y), magenta (M), cyan (C), and black developers (K), respectively, to photoconductor belt 12. A suitable developer is disclosed, for example, in U.S. patent application Ser. No. 08/536,856 to Baker et al., filed Sep. 29, 1995, entitled "LIQUID INK USING A GEL ORGANOSOL". The entire content of the above-referenced patent application is incorporated herein by reference.

As photoconductor belt 12 continues to move in direction 45, the next scanner 26, 28, 30 begins to form a latent image in the imaging region in registration with the latent image formed by the preceding scanner and developed by the preceding development station 32, 34, 36. Thus, the color separation images are formed in registration on top of one another in the same imaging region. The scanners 24, 26, 28, 30 and development stations 32, 34, 36, 38 may be spaced such that an entire latent image is formed and developed prior to formation and development of the next latent image. For increased speed and reduced size, however, each scanner 26, 28, 30 and development station 34, 36, 38 preferably begins formation and development of the next latent image prior to complete formation and development of the preceding latent image.

After scanners 24, 26, 28, 30 and development stations 32, 34, 36, 38 have formed and developed the latent images, the imaging region of the moving photoconductor belt 12 encounters drying station 40. The drying station 40 may include a heated roller 54 that forms a nip with belt roller 18. The heated roller 54 applies heat to photoconductor belt 12 to dry the developer applied by development stations 32, 34, 36, 38. The imaging region of photoconductor belt 12 next arrives at transfer station 42. The transfer station 42 includes an intermediate transfer roller 56 that forms a nip with photoconductor belt 12 over belt roller 14 and a pressure roller 58 that forms a nip with the intermediate transfer roller 56. The developer on photoconductor belt 12 transfers from the photoconductor belt surface to intermediate transfer roller 56 by selective adhesion. The pressure roller 58 serves to transfer the image on intermediate transfer roller 56 to an output substrate 60 by application of pressure and/or heat to the output substrate. The output substrate 60 may comprise, for example, paper or film.

Belt position detection system 43 and belt steering system 44 operate to provide a system for belt registration and registration of color separation images on the photoconductor belt 12. In particular, the registration system of the present invention includes the pulsed light belt position detection system 43 which detects a position of the photoconductor belt 12 relative to a desired continuous transport path. Based on the detected position, the registration system may perform two different functions to ensure precise registration of the color separation images.

First, the registration system includes belt steering system 44 for steering photoconductor belt 12 based on the detected position to reduce deviation of the belt from the continuous transport path. In one exemplary embodiment, the belt steering system 44 is coupled to the roller 15 which functions to correct the positioning of the photoconductor belt 12.

Second, the registration system may further incorporate a scan control system for controlling the laser beams 46, 48, 50, 52 scanned by scanners 24, 26, 28, 30 based on the detected position of photoconductor belt 12 by belt position detection system 43. In particular, the scan control system controls modulation of each laser beam 46, 48, 50, 52 based on the detected position to start each of the image scan segments at a fixed distance relative to a detected edge of photoconductor belt 12. By controlling belt steering and/or laser beam scanning, the registration system of the present invention maintains the image quality of the multi-color image upon transfer of the registered color separation images to the output substrate 60.

Figure 2:
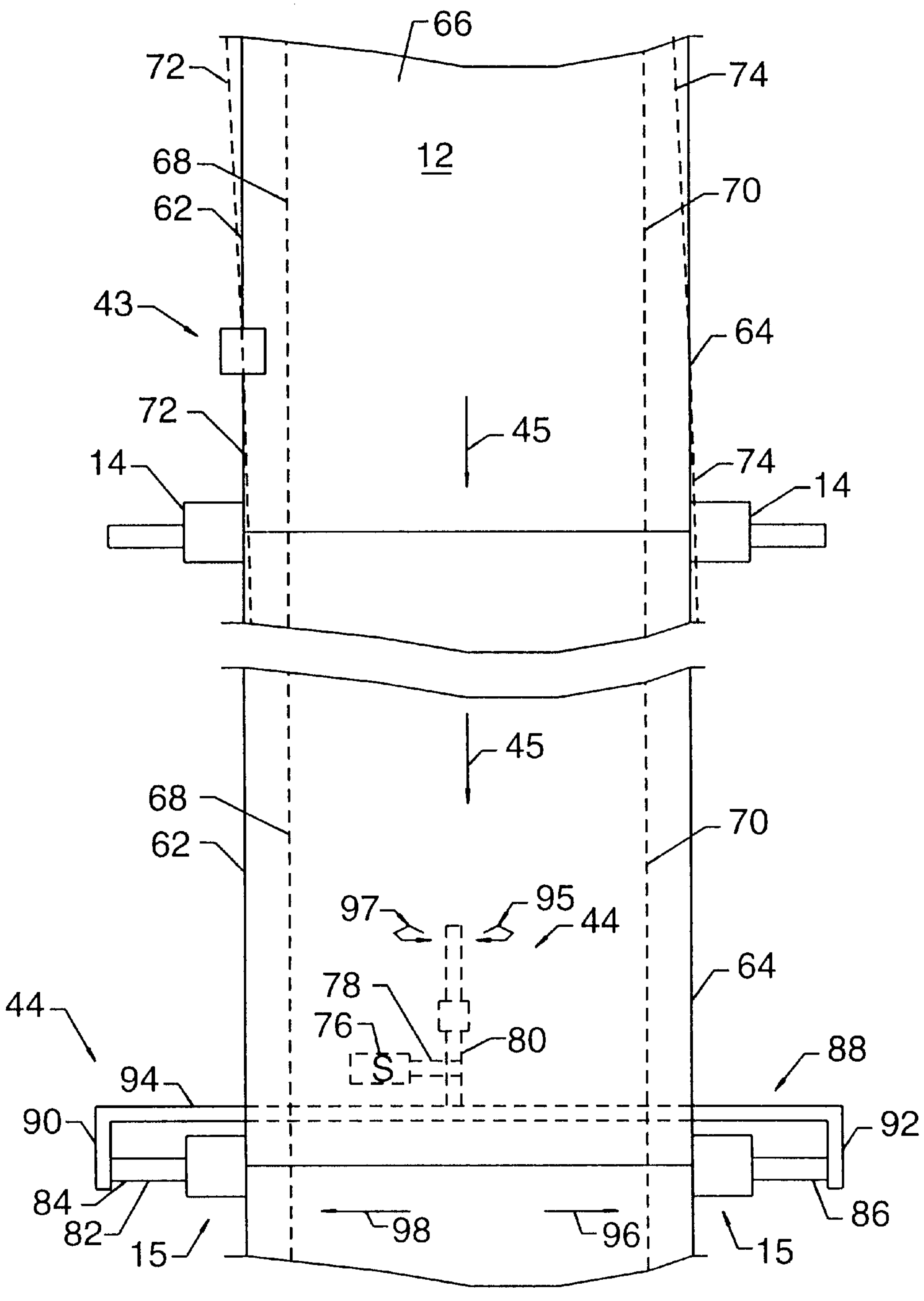
FIG. 2 is a top plan view of an exemplary photoconductor belt and belt steering system used in the electrophotographic imaging system of FIG. 1.

FIG. 2 is a top plan view of an exemplary photoconductor belt 12 for use in electrophotographic imaging system 10 of FIG. 1, showing one embodiment of the pulsed light belt position detection system 43 and belt steering system 44 in accordance with the present invention. As shown in FIG. 2, photoconductor belt 12 includes a left belt edge 62 and a right belt edge 64. The photoconductor belt 12 also includes an imaging region 66. The imaging region 66 includes a left margin 68 positioned at a fixed distance relative to left belt edge 62, and a right margin 70 positioned at a fixed distance relative to right belt edge 64. The left and right margins 68, 70 define the width of imaging region 66 extending in a direction perpendicular to the direction 45 of movement of photoconductor belt 12. The imaging region 66 also has a length defined by top and bottom margins not shown in FIG. 2.

Each scanner 24, 26, 28, 30 is oriented to scan the respective laser beam 46, 48, 50, 52 across the width of imaging region 66 in a scan line. Movement of photoconductor belt 12 in direction 45 relative to each scanner 24, 26, 28, 30 produces a plurality of scan lines on the belt. The laser beam is modulated based on image data representative of the latent image such that each of the scan lines includes an image scan segment. The image scan segments ideally extend between the left and right margins 68, 70 and together form a latent image in imaging region 66. The first and second belt edges 62, 64 ideally extend parallel to direction 45 of movement of photoconductor belt 12. As indicated by dashed lines 72, 74, however, photoconductor belt 12 can move from side to side during travel in direction 45, deviating slightly from the transport path.

To produce a high quality image, the latent images formed by scanners 24, 26, 28, 30 must be formed in precise registration with one another in imaging region 66. Precise registration can be difficult due to the side-to-side movement of photoconductor belt 12 during travel. The left and right margins 68, 70 of imaging region 66 are commonly fixed relative to the left and right edges 62, 64, respectively, of photoconductor belt 12. In contrast, the scan lines and image scan segments of scanners 24, 26, 28, 30 generally are fixed relative to a start-of-scan coordinate. The side-to-side movement of photoconductor belt 12 can cause movement of imaging region 66 relative to the start-of-scan coordinate. As a result, misregistration can occur between different scan lines and between different latent images. This misregistration can significantly degrade image quality. In particular, the misregistration can produce visible artifacts in the ultimate multi-color image upon transfer of the misregistered color separation images to output substrate 60.

The pulsed light belt position detection system 43 operates to detect "belt walking" or the lateral or side-to-side movement of the photoconductor belt 12 relative to its desired transport path. The belt position detection system 43 is described in detail later in the specification. The pulsed light belt position detection system is a belt edge detection system which is not affected by ambient light conditions. In particular, the pulsed light belt position detection system can be used in light conditions ranging from total darkness to very light ambient light conditions. Further, the pulsed light belt position detection system in accordance with the present invention is less susceptible to external noise sources.

The belt steering system 44 may function as a roller adjustment mechanism. In one exemplary embodiment, the belt steering system 44 adjusts a position of roller 15 to move the photoconductor belt 12 in a lateral direction generally perpendicular to the direction of movement of the photoconductor belt 12 to reduce deviation of the photoconductor belt 12 from its desired transport path. The roller adjustment mechanism may be realized in a variety of different mechanisms. In the exemplary embodiment shown, the roller adjustment mechanism includes a solenoid 76 having an actuator 78 coupled to a pin 80 extending from the roller 15. The solenoid 76 is responsive to the pulsed light belt position detection system 43 for correcting the position of photoconductor belt 12 on roller 15. In particular, the roller 15 includes a center pin 82 having a left end 84 and a right end 86 extending outward in opposite directions from the roller 15. A generally U-shaped steering bracket 88 includes a first arm 90 and a second arm 92. The first arm 90 is rotatably coupled to left end 84 and the second arm 92 is rotatably coupled to right end 86. The U-shaped bracket 88 includes an intermediate member 94 which is fixedly attached at its center to the center pin 80. Upon energization of solenoid 76, the actuator 78 is operated to move or rotate the center pin 80 in a clockwise direction 95 or a counter-clockwise direction 97 (indicated by directional arrows 95, 97). This results in movement of the photoconductor belt 12 in a right or first direction 96 or a left or second direction 98. The control and energization of solenoid 76 is responsive to the pulsed light belt position detection system 43, and an associated belt steering controller. The pulsed light belt position detection system 43, belt steering controller, and the belt steering system 44 are described in detail later in the specification.

Figure 2A:
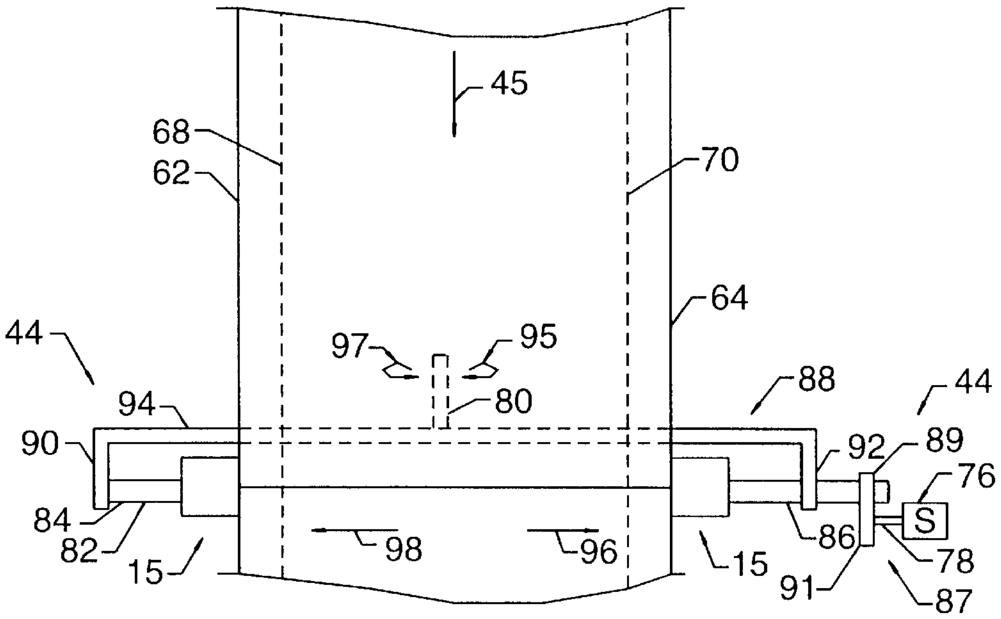
FIG. 2A is a top plan view of another embodiment of a belt steering system for use with the belt registration system in accordance with the present invention.

In FIG. 2A, one exemplary embodiment of an alternative belt steering system is shown at 99. The belt steering system 99 is similar to the belt steering system 44 shown in FIG. 2. In the embodiment shown, the center pin 82 extends beyond the generally U-shaped steering bracket 88 second arm 92. The solenoid 76 is operably coupled to the center pin 82 right end 86. In particular, the solenoid actuator 78 is coupled to the right end 86 through an intermediate linkage 87. The intermediate linkage 87 includes a first end 89 and a second end 91. The first end 89 is rotatably coupled to the center pin right end 86. The second end 91 is fixedly secured to the solenoid actuator 78. Further, center pin 80 is fixedly secured to the generally U-shaped steering bracket 88. In operation, solenoid 76 is responsive to the pulsed light belt position detection system 43 and an associated belt steering controller for movement of the intermediate linkage up or down through actuator 78. In turn, the intermediate linkage 87 moves the roller 15 right end 86 up or down. As the right end 86 is moved up or down, the roller 15 rotates about center pin 80. In particular, upon energization of solenoid 76, the right end 86 is moved up, causing rotation of the roller 15 about center pin 80 in the counter-clockwise direction 97. Similarly, upon movement of right end 86 downward, the roller 15 is rotated about a longitudinal axis as defined by the center pin 80 in a clockwise direction 95. This results in corresponding movement of the photoconductor belt 12 in the left direction 98 or the right direction 96. It is recognized other belt steering systems may be used with the pulsed light belt position detection system in accordance with the present invention.

In the example of FIG. 1, imaging system 10 is a four-color imaging system. However, the registration system of the present invention can be readily applied to provide registration of any number of one or more latent images on a photoconductor belt. In addition, although imaging system 10 is shown as a multi-color/single-pass system in FIG. 1, the registration system of the present invention can be readily applied to multi-pass electrographic imaging systems requiring common registration of color separation images on a photoconductor belt. In a multi-pass imaging system, walking motion of the photoconductor belt may be somewhat periodic. Thus, misregistration between consecutive latent images may be more predictable than in a single-pass system. Nevertheless, a registration system, in accordance with the present invention, is useful in a multi-pass system to improve image quality.

Figure 3:
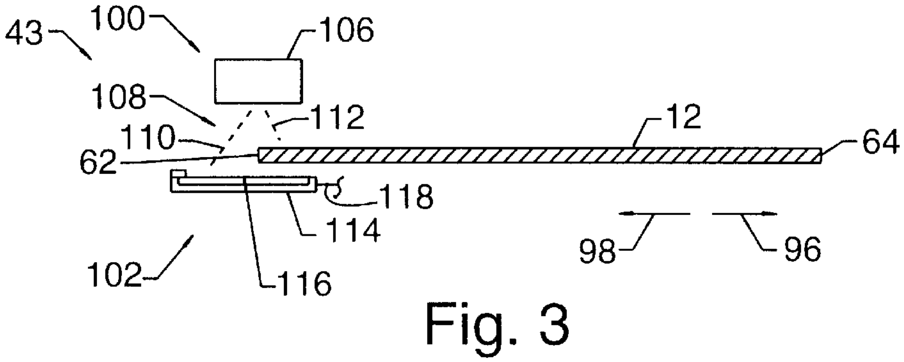
FIG. 3 is a schematic diagram illustrating an example of a belt position detector for use with a registration system, in accordance with the present invention.

FIG. 3 is a schematic diagram illustrating an example of one embodiment of the pulsed light belt position detection system 43 in accordance with the present invention is generally shown. As shown in FIG. 3, the pulsed light belt position detection system 43 includes a pulsed light source 100 and a photodetector 102. The pulsed light source is positioned adjacent to left edge 62 of photoconductor belt 12, and on a side of the photoconductor belt 12 opposite the photodetector 102. Similarly, the photodetector 102 is disposed adjacent to left edge 62 of the photoconductor belt 12, and on a side of the photoconductor belt 12 opposite the pulsed light source 100. As shown in FIG. 3, with the photoconductor belt 12 shown in a generally horizontal plane, the pulsed light source is in vertical optical alignment with the photodetector 102 and overlaps the photoconductor belt 12 left edge 62. It is also recognized that the pulsed light belt position detection system 43 may be located along or adjacent the right edge 64.

In the exemplary embodiment shown; the pulsed light source 100 includes a light emitting diode (LED) 106. The pulsed light source 100 LED 106 emits a pulsed light beam 108 which is generally centered above the left belt edge 62. As such, a first portion 110 of the pulsed light beam 108 is incident on the photodetector 102, and a second portion 112 of the pulsed light beam 108 is incident on the photoconductor belt 12. The portion of pulsed light beam 108 which is incident on the photodetector 102 (110) and the portion of pulsed light beam 108 which is incident on photoconductor belt 12 (112) varies with the degree of side-to-side movement of the left edge 62. Thus, the size of pulsed light beam 108 should be large enough to overlap left edge 62 to at least some degree for the entire range of side-to-side movement of photoconductor belt 12 when it deviates from its continuous transport path. An example of a suitable light emitting diode is 720 Nanometer, NR405AF, commercially available from Stanley Electric Co., Ltd., Japan.

The photodetector 102 may comprise a housing 114 having an active region 116 located thereon. The active region 116 overlaps left edge 62 of photoconductor belt 12. The photodiode should be sensitive to wave lengths of the pulsed light beam 108 emitted by LED 106. The non-overlapping portion of active region 116 occupies the belt edge detection region adjacent to left edge 62. The degree of overlap varies with the degree of side-to-side movement of the left edge 62. Thus, the width of active region 116 should be large enough to overlap left edge 62 to at least some degree for the entire range of side-to-side movement of photoconductor belt 12. An example of a suitable photodiode is a Centronics photodiode.

The pulsed light source 100 continuously provides a pulsed light across the photoconductor belt left edge 62. The pulsed light detection system photodetector 102 generates a belt edge detection signal when the pulsed light beam 108 from the pulsed light source 100 is detected in the active region 116 of the photodetector 102. The photodetector 102 provides a belt edge detection signal 118 which is representative of the pulsed light 108 detected by the active region 116.

In particular, the belt edge detection signal generated by the photodetector 102 is representative of the position of left edge 62 of the photoconductor belt 12, and specifically, is representative of the amount of deviation of the photoconductor belt 12 from its continuous transport path. In the embodiment shown in FIG. 3, movement of the photoconductor belt 12 in the left direction 98 results in less of the light beam first portion 110 to be incident on the photodetector active region 116, and correspondingly resulting in a weaker or lower amplitude belt edge position detection signal 118. Similarly, movement of the photoconductor belt 12 in the right direction 96 results in a corresponding greater amplitude belt edge position detection signal 118.

As the photoconductor belt 12 deviates from a continuous transport path, the belt walking of the photoconductor belt 12 during travel must be corrected in order for belt registration and precise registration of the latent images on the photoconductor belt 12. As such, the belt position detection system 43 detects lateral movement of the photoconductor belt 12 relative to a continuous transport path, and provides an output signal to the belt steering system 44 representative of the detected belt position. Further, by utilizing a pulsed light source for the pulsed light detection system 43, the present invention can be used in a range of light conditions, from total darkness to total light, and is less susceptible to external noise sources.

Figure 4:
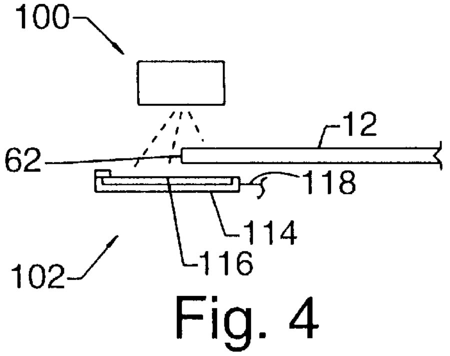
FIG. 4 is a schematic diagram illustrating another example of a belt position detector for use with a registration system, in accordance with the present invention.

As shown in FIG. 4, it is recognized that the pulsed light source 100 can take the form of other pulsed light sources, such as an LED array or laser scanner. It is recognized that the pulsed light source 100 can be any type of pulsed light source which may be detectable by the photodetector 102 for providing a belt edge position detection signal 118 which is representative of the position of the photoconductor left belt edge 62 relative to a continuous transport path. Further, it is recognized that the pulsed light detection system 43 may be located adjacent the right belt edge 64.

Figure 5:
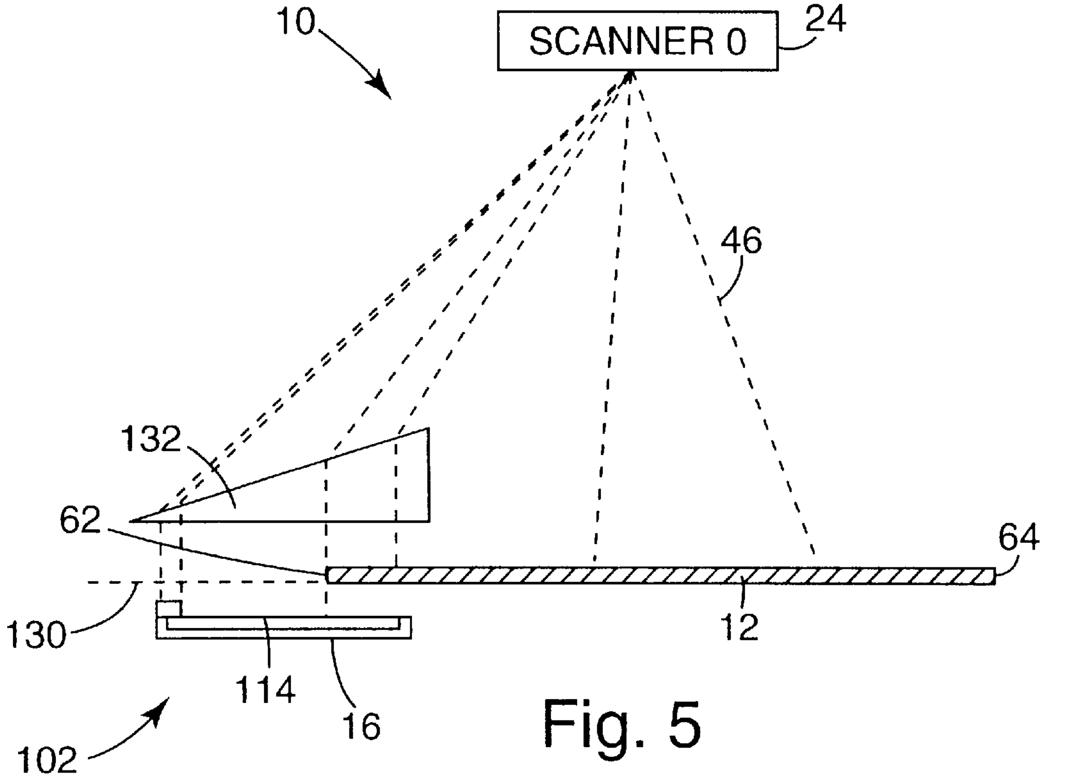
FIG. 5 is yet another example of a belt position detector for use with a registration system, in accordance with the present invention.

In FIG. 5, another embodiment of the present invention is shown. In this embodiment, as an alternative to the use of a dedicated light source for belt position detection, the use of scanners 24, 26, 28 or 30 may be used for both imaging and belt edge detection. In the exemplary embodiment shown, the use of scanner 24 for both imaging and belt edge detection may be very cost effective, less complex, and may facilitate synchronization of the belt position detection with the image scanning process.

Scanner 24 scans the laser beam 46 across photoconductor belt 12 and the pulsed light detection system 43 in a scan line 130. The pulsed light detection system 43 is positioned in alignment with scanner 24 relative to the direction 45 of movement of photoconductor belt 12 to receive laser beam 46 during a portion of scan line 130. In particular, during a first portion of the scan line 130, the scanner 24 scans the portion of the laser beam 46 to form a portion of the latent image on the photoconductor belt 12, and during a second portion of the scan line 130 (outside of the image region), the laser beam 46 is pulsed as it moves across the pulsed light detection system 43.

The laser beam 46 may be used to form a latent image on photoconductor belt 12, and to facilitate detection of the position of the photoconductor belt 12 by pulsed light detection system 43. The scanner 24 advantageously provides both an inexpensive and precise light source for use in the belt edge position detection process. The scanner 24 can scan a laser beam 46 on a "full time" basis. Thus, even when the laser beam 46 emitted by scanner 24 is not being modulated to form a latent image, the scanner 24 is scanning the laser beam in a scan line for purposes of belt position detection. The scan line provided by scanner 24 extends in a direction generally perpendicular to the direction 45 of movement of the photoconductor belt 12. Movement of the photoconductor belt 12 in a direction 45 perpendicular to the scan line produces a plurality of scan lines across the photoconductor belt 12. The scanner may include, for example, a laser diode for emitting the laser beam 46, a scanning mechanism for scanning the laser beam across the photoconductor belt 12, and optics for focusing the laser beam on the photoconductor belt. The scanning mechanism may comprise, for example, a multi-faceted rotating mirror controlled by a scan drive motor.

In FIG. 5, it is recognized that optical means 132 in the form of a correcting prism may be disposed between scanner 24 and the photodetector 102. In particular, the correcting prism 132 is disposed between scanner 24 and the photoconductor belt 12. The correcting prism 132 is positioned over the photoconductor left belt edge 62 and photodetector active region 114, and directs laser beam 46 at an angle substantially perpendicular to the photoconductor belt 12. The correcting prism 152 receives laser beam 46 at a position above the belt edge 62, and thereby prevents premature obstruction of the laser beam 46 by the edges of the photoconductor belt 12. The correcting prism 132 ensures that any vertical movement of the photoconductor belt 12 will not be mistakenly perceived as side-to-side movement (or belt walking) of the photoconductor belt 12.

Figure 6:
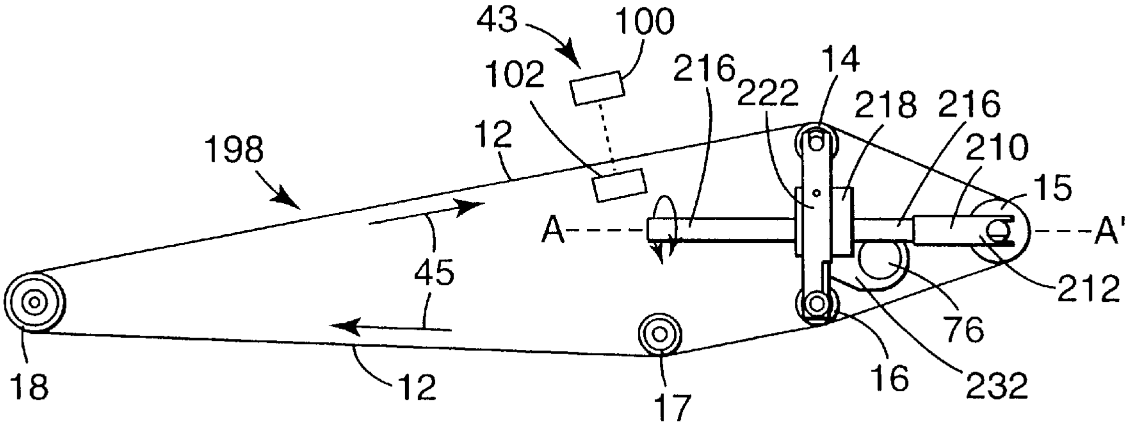
FIG. 6 is a side view of an exemplary photoconductor belt apparatus that makes use of a belt steering control system useful in a registration system, in accordance with the present invention.
Figure 7:
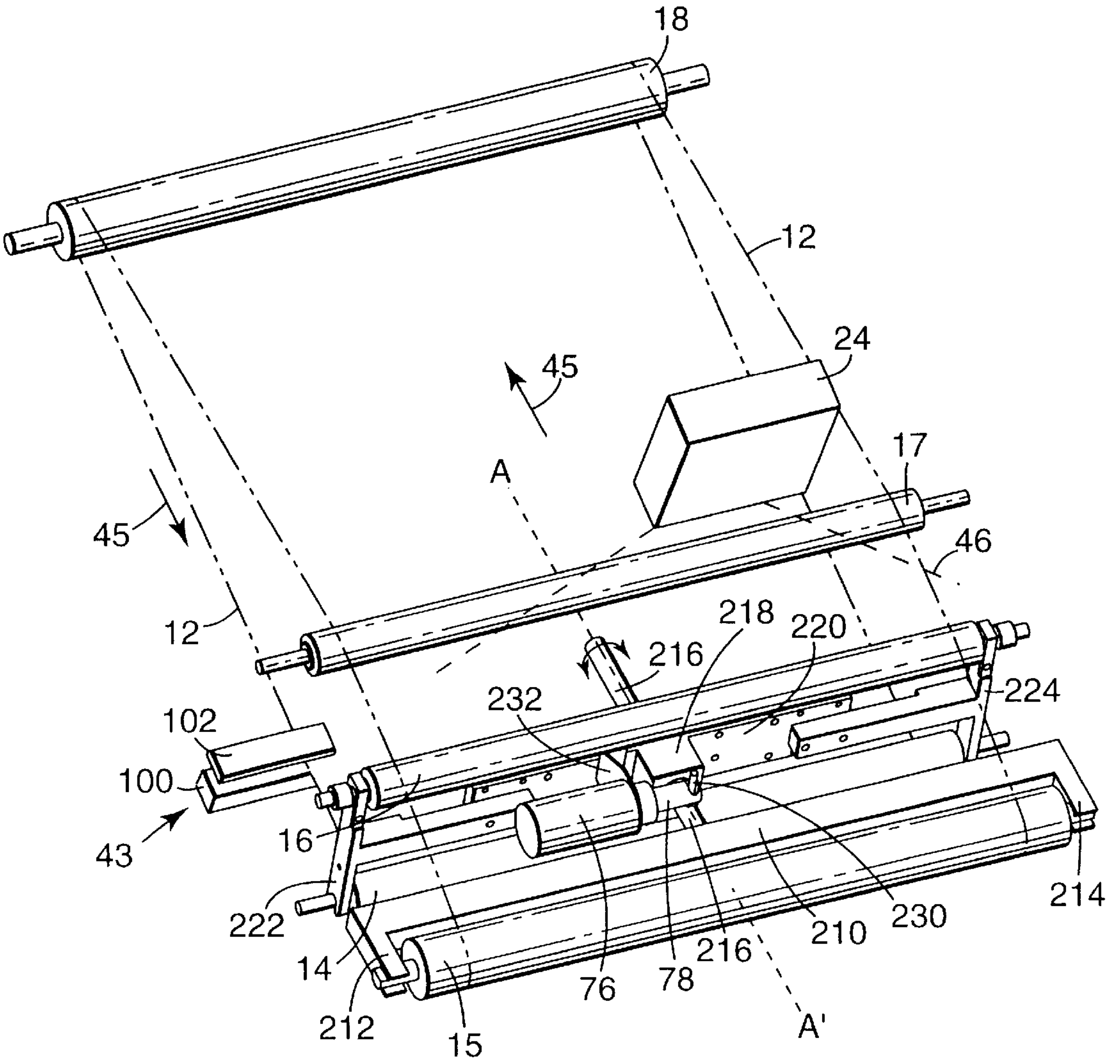
FIG. 7 is a bottom perspective view of the photoconductor belt apparatus of FIG. 6.

FIGS. 6 and 7 illustrate an exemplary photoconductor belt apparatus 198 that makes use of a belt steering control system useful in a registration system, in accordance with the present invention. For ease of illustration, FIG. 7 shows only one of the plurality of scanners 24, 26, 28, 30 ordinarily positioned to scan laser beams 46, 48, 50, 52 across photoconductor belt 12, and the pulsed light detection system 43. FIGS. 6 and 7 show the pulsed light detection system 43 as photodetector 102 mounted on a circuit board 200. In the exemplary apparatus of FIGS. 6 and 7, photoconductor belt 12 is mounted about rollers 14, 15, 16, 17, 18. The shaft of one of rollers 14, 15, 16, 17, 18 (in the particular embodiment shown, roller 18) is coupled to a drive mechanism such as a motor (not shown) either directly or via any of a variety of drive transmissions. The drive mechanism drives the roller, which frictionally drives photoconductor belt 12 to move about rollers 14, 15, 16, 17, 18 in a continuous transport path in the direction indicated by arrow 45. As shown in FIGS. 6 and 7, roller 15 is supported on a pivotable carriage 210 that forms part of a belt steering mechanism, in accordance with the present invention.

Figure 8:
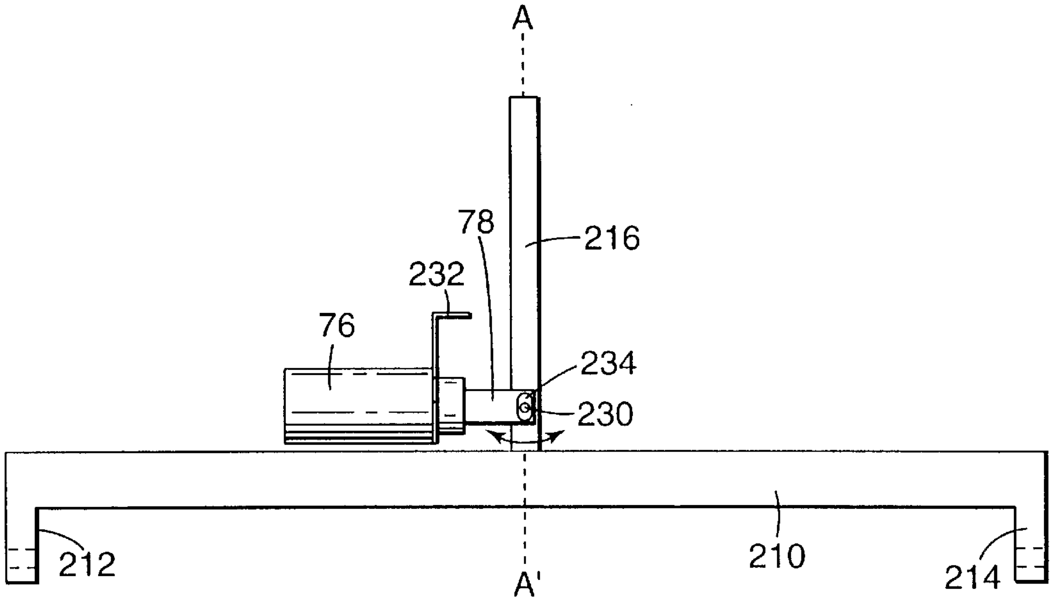
FIG. 8 is a front view of a belt steering mechanism useful in the belt steering control system of FIG. 6.
Figure 9:
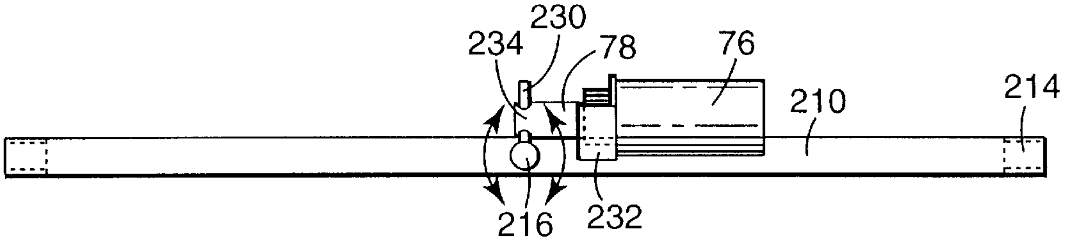
FIG. 9 is a top plan view of the belt steering mechanism of FIG. 8.

FIGS. 8 and 9 further illustrate carriage 210. The pivotable carriage 210 includes a pair of carriage mounts 212, 214. Each of the carriage mounts 212, 214 retains one end of the shaft of roller 15. The carriage 210 is mounted in a fixed manner to a carriage pin 216. The carriage pin 216 mounts to a central portion of carriage 210. The carriage 210 moves photoconductor belt 12 in a direction perpendicular to the transport path by rotation about a steering axis A–A' coincident with the longitudinal axis of carriage pin 216. To enable rotation, carriage pin 210 is mounted in a journal bearing (not shown) in a support block 218. The support block 218 includes a support plate 220. First and second block mounts 222, 224 are coupled to support plate 220. The first and second block mounts 222, 224 retain opposite ends of the shafts associated with rollers 14 and 16.

In this example, the belt steering mechanism functions as a roller adjustment mechanism that adjusts a position of roller 15 to move photoconductor belt 12. The roller adjustment mechanism may be realized by a variety of different mechanisms. As illustrated by the example of FIGS. 6, 7, 8, and 9, the roller adjustment mechanism may include solenoid 76 having an actuator 78 coupled to an actuator pin 230 extending outward from carriage pin 216. A number of different actuating mechanisms could be used such as, for example, a stepper motor. The solenoid 76 is mounted on a bracket 232 coupled to support block 218. The actuator pin 230 extends through an aperture 234 in actuator 78 of solenoid 76. The actuator extends perpendicular to carriage pin 216 and, consequently, steering axis A–A'. The belt steering controller transmits a signal that selectively energizes and de-energizes solenoid 76 to move actuator 78 inward and outward relative to the solenoid 76. The actuator 78 thereby moves actuator pin 230 to rotate carriage pin 216 in the journal bearing in support block 210. The rotation of carriage pin 216 adjusts the position of roller 15 relative to the other rollers 14, 16, 17, and 18. The photoconductor belt 12 tends to move in a direction perpendicular to the continuous transport path in response to adjustment of the position of roller 15. In particular, photoconductor belt 12 tends to walk laterally along roller 15 in response to the variation in the attitude of the roller.

Figure 10:
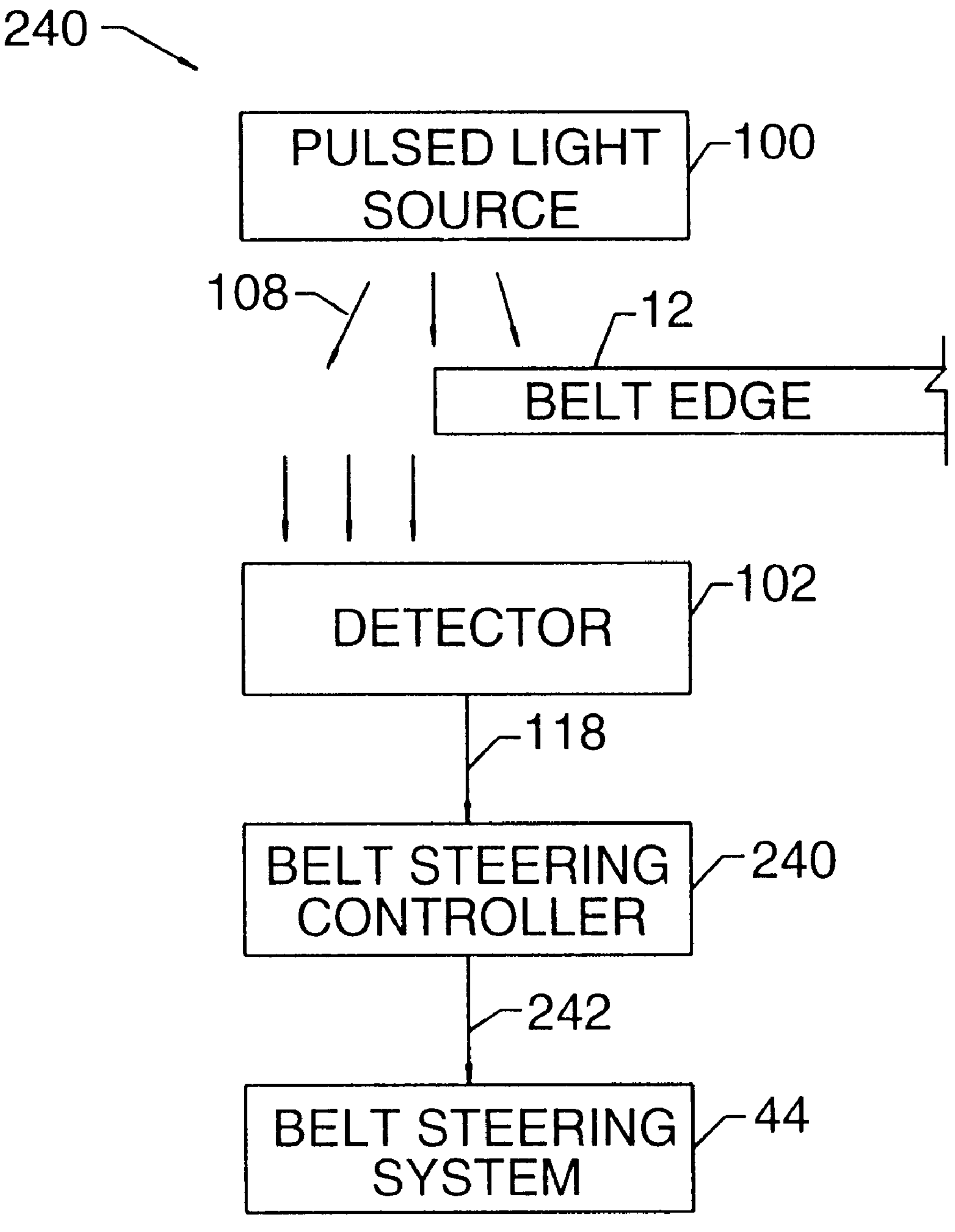
FIG. 10 is a functional block diagram illustrating a belt position detection system and a belt steering system for registration of one or more color separation images on a photoconductor belt in accordance with the present invention.

FIG. 10 is a functional block diagram illustrating operation of the pulsed light detection system 43 and belt steering system 44 in accordance with the present invention is generally shown at 240. As previously described herein, the pulsed light source 100 is in optical alignment with photodetector 102. The photodetector 102 is responsive to the pulsed light source 100 for providing the belt edge detection signal 118, the amplitude of which is representative of the lateral position of the photoconductor belt 12 relative to a continuous transport path. The present invention further includes a belt steering controller 240 which is electrically coupled to the photodetector 102. The belt steering controller 240 is responsive to the belt edge detection signal 118 for providing a control signal, indicated at 242, to belt steering system 44 for activation/deactivation of the belt steering system 44 to reduce the deviation of the photoconductor belt 12 from the continuous transport path.

In one exemplary embodiment, the belt steering controller controls the belt steering mechanism based on the belt position detection signals generated by the pulsed light detection system 43, and more specifically, based on the belt position detection signal generated by photodetector 102 to reduce deviation of photoconductor belt 12 from the continuous transport path. In this manner, belt steering controller 240 reduces significant deviation that can lead to misregistration of the latent images formed by scanners 24, 26, 28, 30 on photoconductor belt 12. The belt steering controller 240 may be configured to energize solenoid 76 based on the belt edge detection signal for a period of time sufficient for photoconductor belt 12 to walk along roller 15 to the appropriate lateral position in the transport path. The period of time can be determined based on the position information provided by the belt position detection signal and knowledge of the rate of movement characteristics of photoconductor belt 12 along roller 15. The belt steering controller 240 also could be configured to energize solenoid 76 for period of time until the belt edge detection signals indicates that the position of the belt edge has returned to the proper position.

Alternatively, solenoid 76 may be configured to move actuator 78 between multiple positions in response to different levels of energization, or different control signals. In this case, based on the belt edge detection signal, belt steering controller 240 may be configured to apply to solenoid 76 a signal that drives actuator 78 to a particular position. The particular position can be selected to achieve a degree rotation of carriage pin 216 sufficient for photoconductor belt 12 to walk to the appropriate lateral position. As another alternative, belt steering controller 240 can be configured to modulate both energization time and position of solenoid 76 to achieve desired movement of photoconductor belt 12.

As with the scan control system, solenoid 76 and the belt steering controller 240 may be configured to provide no more than a maximum degree of movement of photoconductor belt 12 in a given time to avoid sudden adjustments that could be visible in the final multi-color image. Further, the belt steering controller may be configured to control solenoid 76 in response to the belt edge detection signal 118 value received for each scan line, as with the scan control system. However, it may be sufficient to engage the belt steering system on a less frequent basis, such as for every n scan lines, particularly when the scan control system of the present invention is used.

Figure 11:
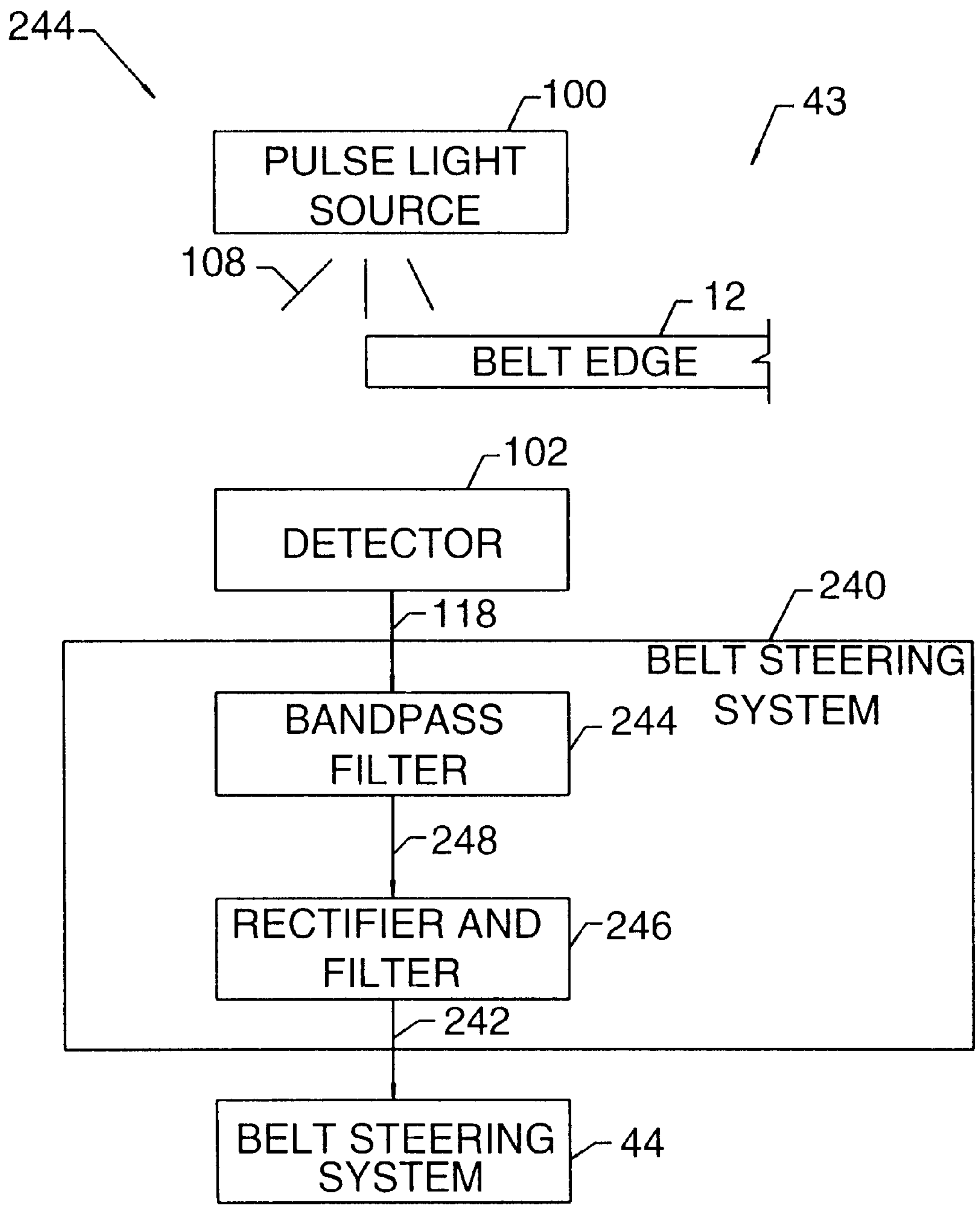
FIG. 11 is a functional block diagram illustrating another belt position detection system and a belt steering system for registration of one or more color separation images on a photoconductor belt in accordance with the present invention.

In FIG. 11, a functional block diagram illustrating one exemplary embodiment of the belt position detection system and belt steering system for registration of one or more color separation images on a photoconductor belt in accordance with the present invention is generally shown at 244. In this embodiment, the pulse light detection system 43 can be termed an "asynchronous detection system". In this embodiment, the photodetector 102 is a reversed biased photodiode which will allow only the pulsed light beam to be generated as belt edge detection signal 118 in the form of a square wave. The pulsed light beam 108 is received by the photodetector 102, with the resulting belt edge detection signal 118, in the form of a sine wave, being generated which is representative of the position of the photoconductor belt 12.

The belt edge detection signal 118 is output to belt steering controller 240. In the exemplary embodiment shown, the belt steering controller 240 includes a band pass filter 244 which is electrically coupled to a rectifier and filter 246, indicated at 248. The belt edge detection signal 118 is input to the band pass filter 244. It is recognized that an amplifier, such as an adjustable analog amplifier, may be coupled between the photodetector 102 and the band pass filter 244. The band pass filter 244 has a center frequency which is approximately equal to the frequency of the pulsed light source 100. The band pass filter 244 functions to filter out undesired noise and frequencies, such as 60 cycle pick-up, and provides an output signal 248 in the form of a sine wave to rectifier and filter 246. At rectifier and filter 246, the sine wave is rectified and passed through an R-C circuit, being converted from an AC signal to a DC output signal, which is indicated as signal 242.

Accordingly, the signal 242 is a DC signal which is representative and proportional to the position of the photoconductor 12 belt edge 62, relative to a continuous path. As previously described herein, the signal 242 is output to the belt steering system 44 for controlled energization (activation/deactivation) of the belt steering system 44.

Figure 12:
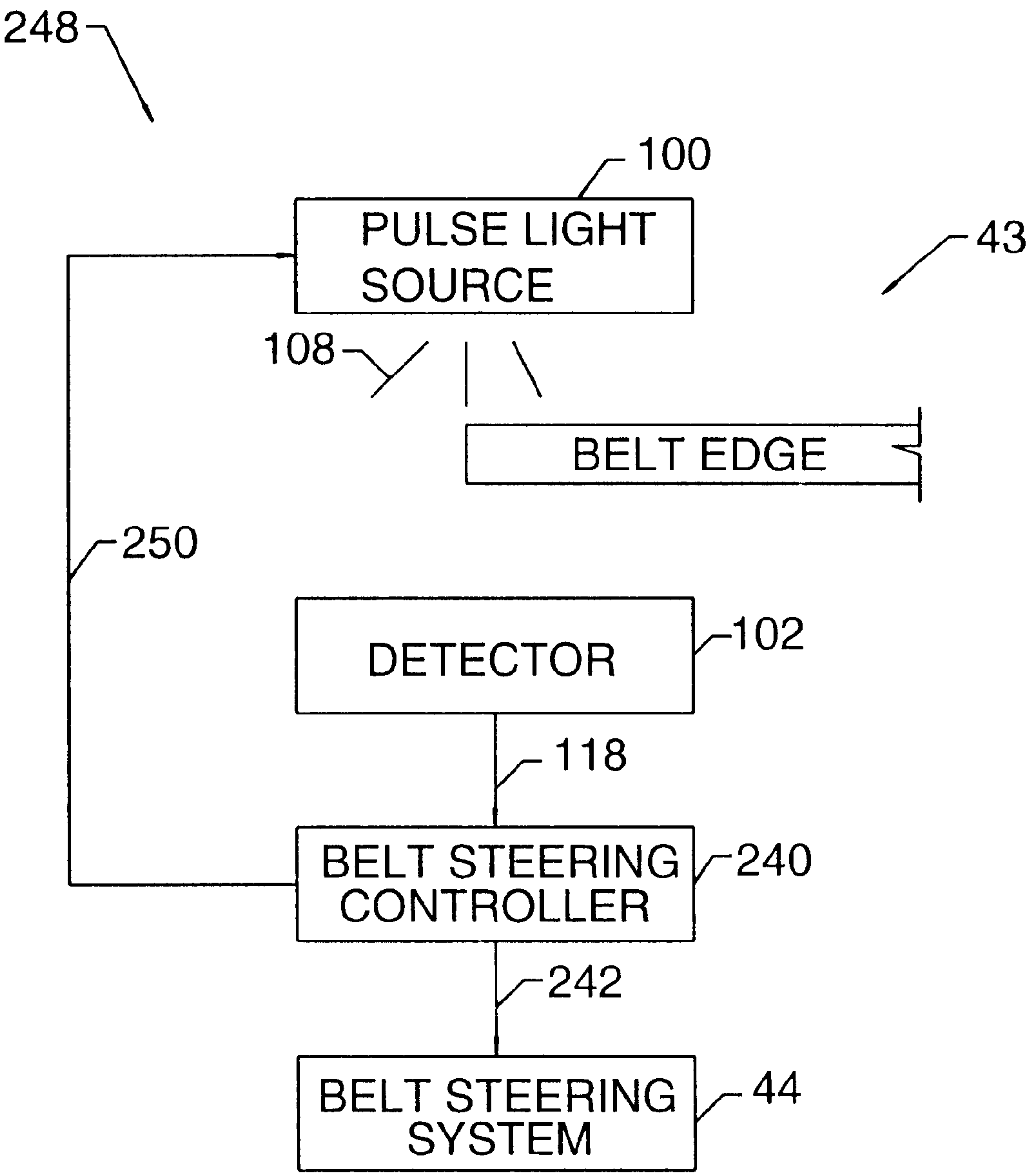
FIG. 12 is a functional block diagram illustrating another belt position detection system and a belt steering system for registration of one or more color separation images on a photoconductor belt in accordance with the present invention.

In FIG. 12, a functional block diagram illustrating another embodiment of the belt position detection system and belt steering system in accordance with the present invention is generally shown at 248. In the exemplary embodiment shown, the pulse light detection system 43 operates as a synchronous detection system. The belt steering controller 240 provides a pulse input signal to pulse light source 100, indicated at 250. The belt steering controller 240 operates to synchronize the pulse light source 100 with the output signal 242 to belt steering system 44.

Figure 13:
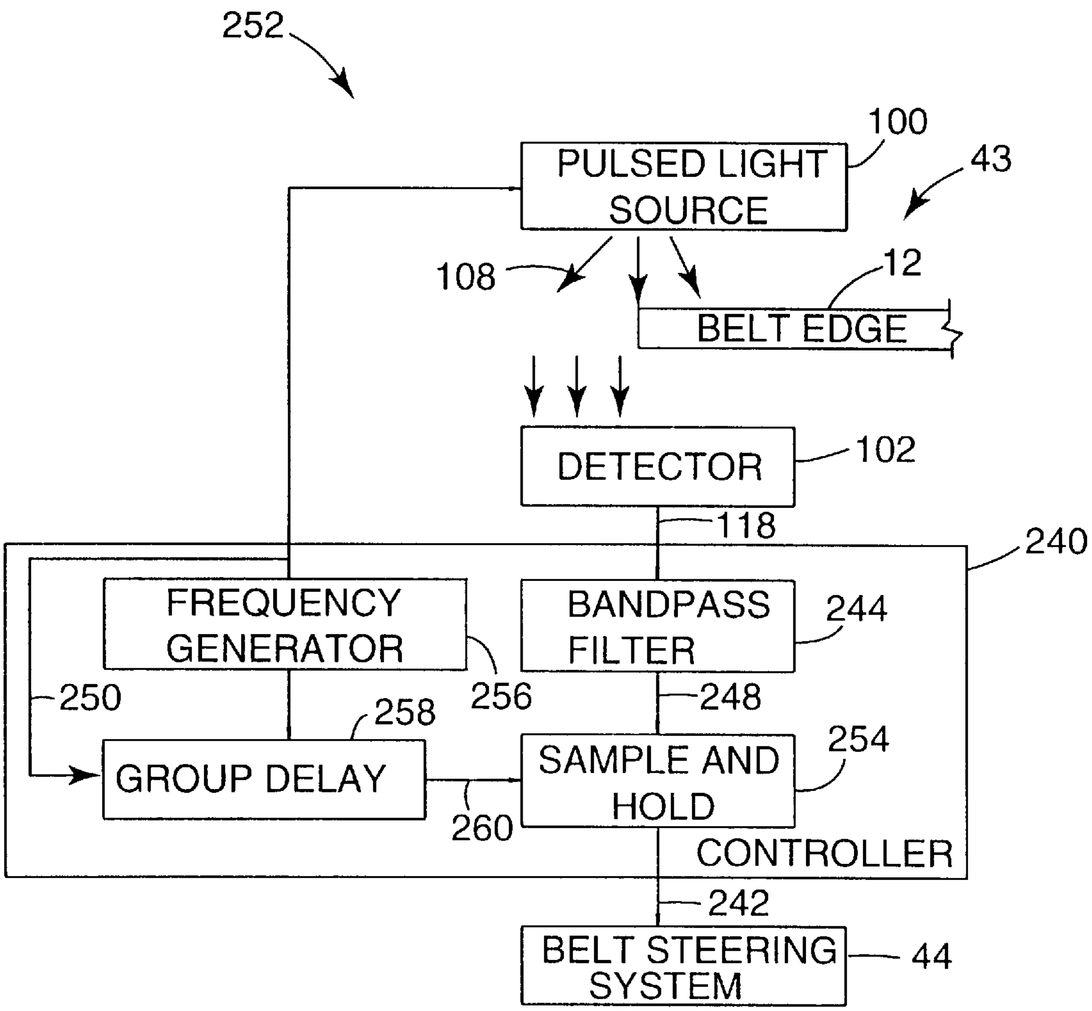
FIG. 13 is a functional block diagram illustrating another belt position detection system and a belt steering system for registration of one or more color separation images on a photoconductor belt in accordance with the present invention.

In FIG. 13, a functional block diagram illustrating one exemplary embodiment of a synchronous belt position detection system and a belt steering system in accordance with the present invention is generally shown at 252. In this embodiment, the belt steering controller 240 includes band pass filter 244, a sample and hold circuit 254, a frequency generator 256, and a group delay 258. As previously described herein, the belt edge detection signal 118 is input to band pass filter 244, resulting in a sine wave output signal 248, the amplitude of which is representative of the position of the photoconductor belt 12 relative to the continuous transport path. The output signal 248 is input to sample and hold 254. Frequency generator 256 provides a pulsed input signal 250 to pulse light source 100 and group delay 258. Group delay 258 is coupled to sample and hold 254, indicated at 260. The group delay 258 and sample and hold 254 operate to delay the corresponding input signals 250 and 248 in order to provide compensation for the phase delay of the processed signal. This provides synchronization of the pulsed input signal 250 (from frequency generator 256 to pulsed light source 100) and the output signal 242 to belt steering system 44, which is representative of the position of the photoconductor belt 12 relative to a desired continuous path. Further, it is recognized that belt steering controller 240 or belt steering system 44 may include other control mechanisms, such as a pulse width modulator (PWM) for providing a desired output signal 242 to the belt steering system 44.

Figure 14:
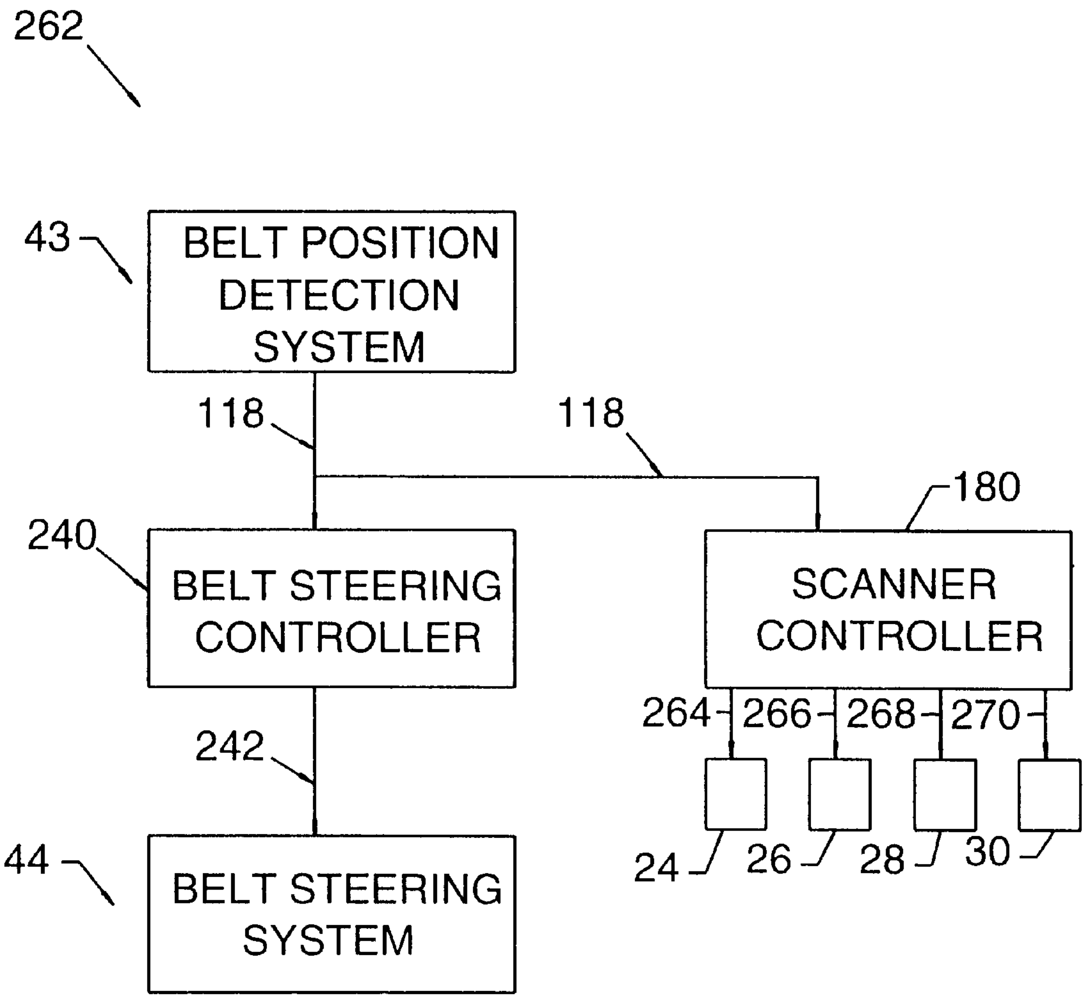
FIG. 14 is a functional block diagram illustrating a system for registration of one or more color separation images on a photoconductor belt in accordance with the present invention.

In FIG. 14, another block diagram showing a registration system in accordance with the present invention is generally indicated at 262. The output signals 118 from the pulsed light detection system 43 may be output to a scanner controller 242 which controls the modulation of the laser scanners 24, 26, 28, 30, indicated at 264, 266, 268 and 270. Based on the detected position of photoconductor belt 12, the scanner controller 262 modulates the output signals to laser scanners 24, 26, 28 or 30 for precise registration of the latent images on the photoconductor belt 12.

In particular, the scanner controller 262 controls modulation of each laser beam 46, 48, 50, 52 based on the detected position to start each of the-image scan segments at a fixed distance relative to the belt edge 62. By controlling belt steering and laser beam scanning relative to the belt edge 62, the registration system of the present invention maintains the image quality of the multi-color image transfer of the registered color separation images to output substrate 12.

With the pulsed light detection system 43 in accordance with the present invention, the system can be used in ambient light conditions ranging from bright ambient light to total darkness. The pulsed light detection system 43 is less susceptible to external noise sources. Known conventional detection systems used in electrophotography may only be used in "closed" or dark environments, wherein the photodetector is able to distinguish between the light source used for detection and the scanner used for imaging on the photoconductor belt. Such systems do not lend themselves to repair or testing, wherein a repair operator has the imaging system opened up for repair. In such a situation, the detection system may not be able to differentiate between the detection system light source and the room or ambient light. Since the present invention utilizes a pulsed light detection system which may be used in a range of light conditions, it is not susceptible to such problems. The present invention utilizes the frequency of the pulsed light source for detection, and does not rely on the intensity of the light source.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. A system for registration of a photoconductor belt for use in a multi-color electrophotographic imaging system, wherein the photoconductor belt is moved in a first direction forming a continuous transport path, and wherein the photoconductor belt tends to deviate from the transport path in a direction substantially perpendicular to the first direction, the system comprising:

a pulsed light source;

a photodetection mechanism disposed to overlap the edge of the photoconductor belt, wherein the photodetection mechanism is responsive to the pulsed light source and provides a belt position signal representative of a position of the photoconductor belt relative to the continuous transport path, in a direction substantially perpendicular to the first direction;

a belt steering mechanism operably coupled to the photoconductor belt for adjusting movement of the photoconductor belt in the direction substantially perpendicular to the first direction; and a belt steering controller responsive to the belt position signal for controlling the belt steering mechanism based on the belt position signal to reduce deviation of the photoconductor belt from the transport path;

wherein the pulsed light source comprises a light emitting diode coupled to a pulse generator.

2. A system for registration of a photoconductor belt for use in a multi-color electrophotographic imaging system, wherein the photoconductor belt is moved in a first direction forming a continuous transport path, and wherein the photoconductor belt tends to deviate from the transport path in a direction substantially perpendicular to the first direction, the system comprising:

a pulsed light source;

a photodetection mechanism disposed to overlap the edge of the photoconductor belt, wherein the photodetection mechanism is responsive to the pulsed light source and provides a belt position signal representative of a position of the photoconductor belt relative to the continuous transport path, in a direction substantially perpendicular to the first direction;

a belt steering mechanism operably coupled to the photoconductor belt for adjusting movement of the photoconductor belt in the direction substantially perpendicular to the first direction; and a belt steering controller responsive to the belt position signal for controlling the belt steering mechanism based on the belt position signal to reduce deviation of the photoconductor belt from the transport path;

wherein the pulsed light source is a pulsed laser scanner.

3. A system for registration of a photoconductor belt for use in a multi-color electrophotographic imagine system, wherein the photoconductor belt is moved in a first direction forming a continuous transport path, and wherein the photoconductor belt tends to deviate from the transport path in a direction substantially perpendicular to the first direction, the system comprising:

a pulsed light source;

a photodetection mechanism disposed to overlap the edge of the photoconductor belt, wherein the photodetection mechanism is responsive to the pulsed light source and provides a belt position signal representative of a position of the photoconductor belt relative to the continuous transport path, in a direction substantially perpendicular to the first direction;

a belt steering mechanism operably coupled to the photoconductor belt for adjusting movement of the photoconductor belt in the direction substantially perpendicular to the first direction; and a belt steering controller responsive to the belt position signal for controlling the belt steering mechanism based on the belt position signal to reduce deviation of the photoconductor belt from the transport path;

wherein the pulsed light source is pulsed at a frequency different than 60 hertz.

4. A system for registration of a photoconductor belt for use in a multi-color electrophotographic imaging system, wherein the photoconductor belt is moved in a first direction forming a continuous transport path, and wherein the photoconductor belt tends to deviate from the transport path in a direction substantially perpendicular to the first direction, the system comprising:

a pulsed light source;

a photodetection mechanism disposed to overlap the edge of the photoconductor belt, wherein the photodetection mechanism is responsive to the pulsed light source and provides a belt position signal representative of a position of the photoconductor belt relative to the continuous transport path, in a direction substantially perpendicular to the first direction;

a belt steering mechanism operably coupled to the photoconductor belt for adjusting movement of the photoconductor belt in the direction substantially perpendicular to the first direction; and a belt steering controller responsive to the belt position signal for controlling the belt steering mechanism based on the belt position signal to reduce deviation of the photoconductor belt from the transport path;

wherein the pulsed light source is pulsed at a high frequency relative to 60 hertz.

5. A system for registration of a latent image relative to an edge of a photoconductor belt, wherein the photoconductor belt is moved in a first direction forming a continuous transport path, and wherein the photoconductor belt tends to deviate from the transport path in a direction substantially perpendicular to the first direction, the system comprising:

a scanner for scanning a laser beam across the photoconductor belt;

a scan controller for modulating the laser beam based on image data to form the latent image on the photoconductor belt;

a pulsed light source located adjacent the edge of the photoconductor belt;

a photodetection mechanism disposed to overlap the edge of the photoconductor belt, wherein the photodetection mechanism is responsive to the pulsed light source and provides a belt position signal representative of a position of the photoconductor belt relative to the continuous transport path in a direction substantially perpendicular to the first direction;

a belt steering mechanism operably coupled to the photoconductor belt for adjusting movement of the photoconductor belt in the direction substantially perpendicular to the first direction; and a belt steering controller responsive to the belt position signal for controlling the belt steering mechanism based on the belt position signal to reduce deviation of the photoconductor belt from the transport path.

6. The system of claim 5, wherein the pulsed light source is located on a side of the photoconductor belt opposite the photodetection mechanism, and wherein the pulsed light source is in optical alignment with the photodetection mechanism.

7. The system of claim 5, wherein the pulsed light source comprises a light emitting diode coupled to a pulse generator.

8. The system of claim 5, wherein the pulsed light source is a pulsed laser scanner.

9. The system of claim 5, wherein the pulsed light source is pulsed at a frequency greater than 100 hertz.

10. The system of claim 5, further wherein the scanner is in optical alignment with the photodetection mechanism, and wherein the scanner scans a laser beam across the photoconductor belt and provides the pulsed light source for scanning the laser beam across the photoconductor belt.

11. The system of claim 10, further comprising optical means, disposed between the scanner and the photodetection mechanism, for directing the laser beam to be incident on the photodetector at an angle substantially perpendicular to the photoconductor belt.

12. The system of claim 11, wherein the optical means includes a prism disposed between the scanner and the photoconductor belt, wherein the prism overlaps the photodetection mechanism and the edge of the photoconductor belt.

13. The system of claim 5, wherein the belt steering mechanism having a plurality of rollers includes a roller adjustment mechanism for adjusting a position of one of the plurality of rollers, wherein the photoconductor belt tends to move in the direction substantially perpendicular to the continuous path in response to the adjustment of a portion of a respective one of the plurality of rollers.

14. A system for registration of a latent image on a photoconductor belt, the system comprising:

a photoconductor belt mounted about a plurality of rollers;

a drive mechanism for driving the photoconductor belt to move about the rollers in a first direction forming a transport path, wherein the photoconductor belt tends to deviate from the transport path in a direction substantially perpendicular to the first direction;

a photodetector disposed to overlap an edge of the photoconductor belt;

a pulse generator;

a light source coupled to the pulse generator, wherein the light source is positioned adjacent the photoconductor belt for providing a pulsed light beam incident on the photoconductor belt and incident on the photodetector, wherein the photodetector is responsive to the pulsed light beam for providing a belt position signal representative of a position of the photoconductor belt relative to the transport path in a direction substantially perpendicular to the first direction;

a belt steering mechanism operably coupled to the photoconductor belt for adjusting movement of the photoconductor belt in the direction substantially perpendicular to the first direction; and a belt steering controller for controlling the belt steering mechanism based on the belt position signal to reduce deviation of the photoconductor belt from the transport path.

15. The system of claim 14, further comprising:

a laser scanner for scanning a laser beam across the photoconductor belt at a scan frequency; and a scan controller for modulating the laser beam based on data to form the latent image on the photoconductor belt.

16. The system of claim 15, wherein a frequency of the pulse generator is different than the scan frequency of the laser scanner.

17. The system of claim 15, wherein a frequency of the pulse generator is 10 times greater than the scan frequency of the laser scanner.

18. The system of claim 14, wherein belt steering mechanism includes a solenoid having an actuator coupled to a roller wherein upon energization of the solenoid the roller is adjusted resulting in movement of the photoconductor belt in a direction substantially perpendicular to the first direction and in a direction which reduces deviation of the photoconductor belt from the transport path.

19. The system of claim 14, wherein the belt steering controller includes an asynchronous detection system responsive to the belt position signal for providing a direct current signal to the belt steering mechanism, wherein the direct current signal is proportional to belt position.

20. The system of claim 19, wherein the asynchronous detection system includes a band pass filter electrically coupled to a rectifier.

21. The system of claim 14, wherein the belt steering controller includes a synchronous detection system responsive to the belt position signal for providing a direct current signal to the belt steering mechanism, wherein the direct current signal is proportional to belt position.

22. The system of claim 21, wherein the synchronous detection system is coupled to the pulse generator.

23. The system of claim 21, wherein the synchronous detection system includes a band pass filter coupled to a sample and hold circuit.

24. The system of claim 23, wherein the sample and hold circuit is responsive to the pulse generator.

25. The system of claim 24, further comprising a group delay circuit coupled between the pulse generator and the sample and hold circuit.

* * * * *